UNITED STATES PATENT OFFICE.

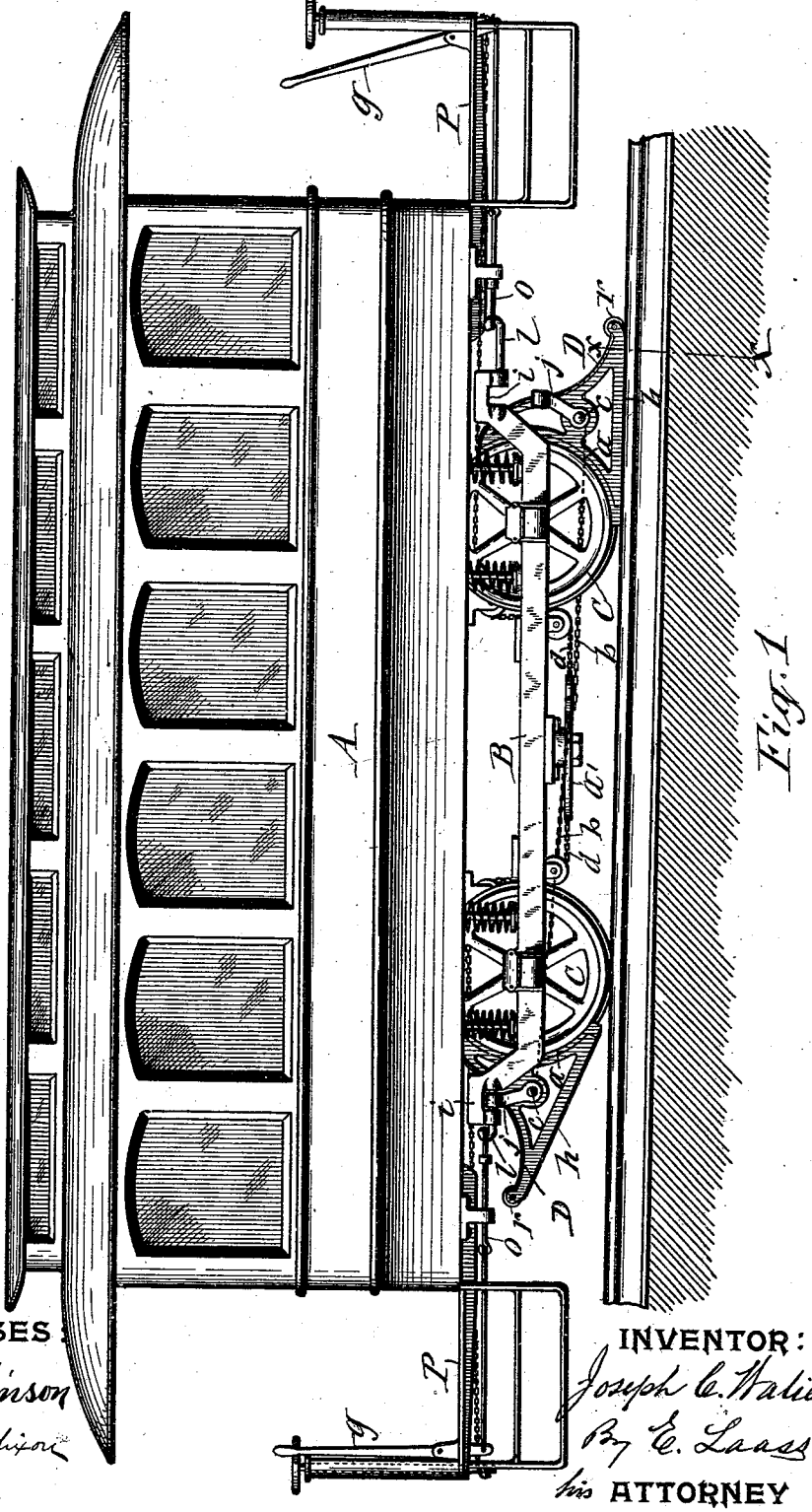

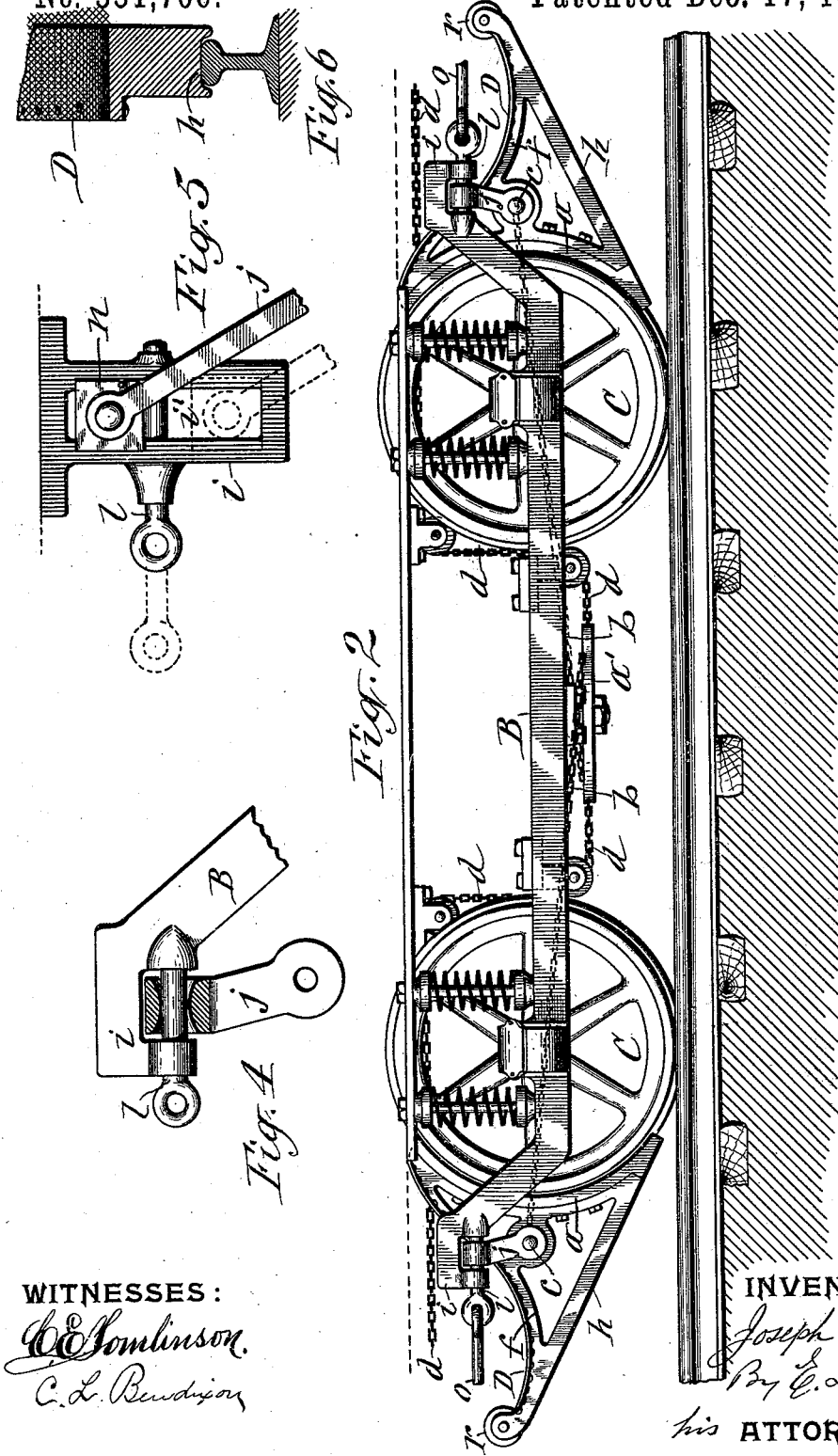

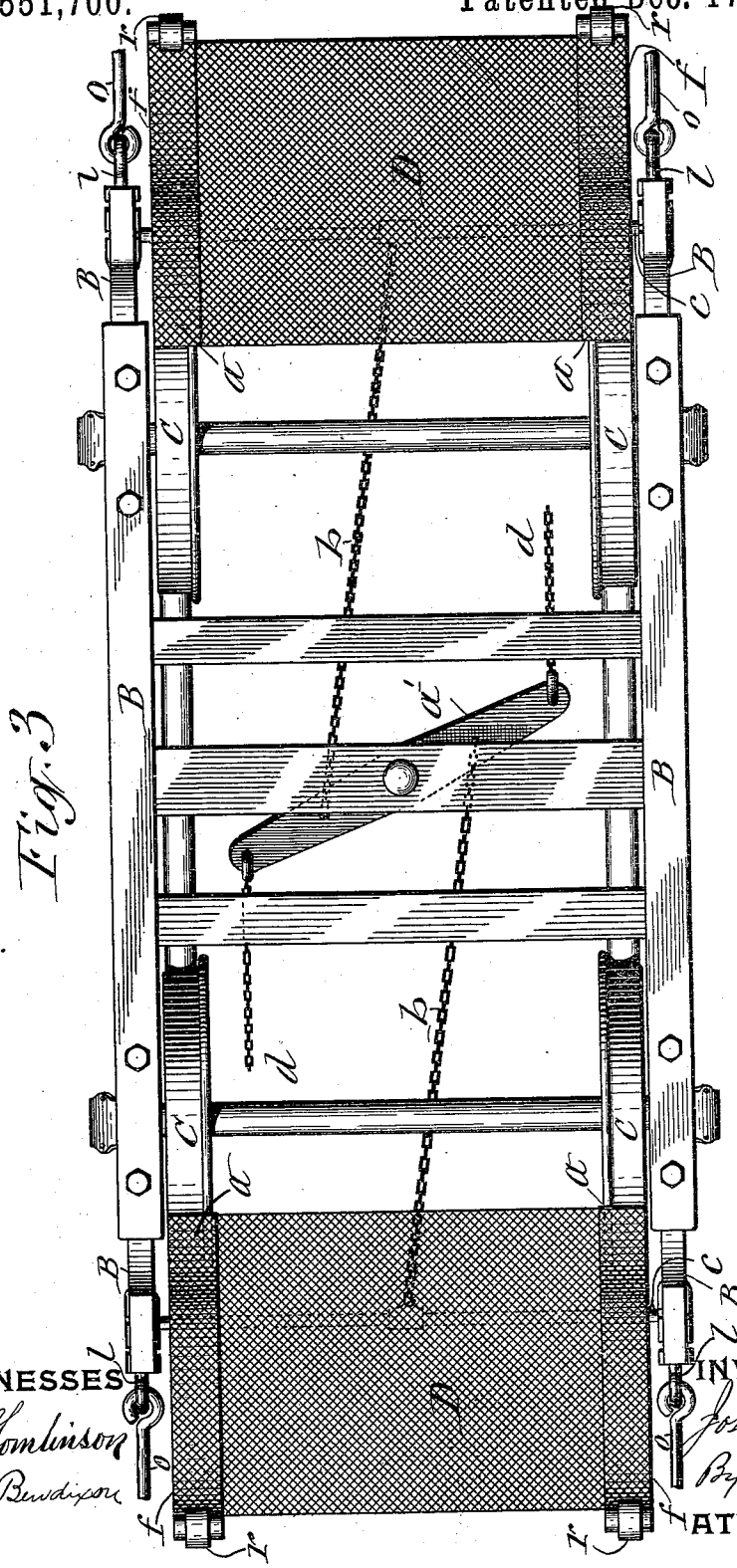

JOSEPH C. WALIER, OF SYRACUSE, NEW YORK.

COMBINED CAR BRAKE AND FENDER.

SPECIFICATION forming part of Letters Patent No. 551,700, dated December 17, 1895.

Application filed April 26, 1895. Serial No. 547,226. (No model.)

*To all whom it may concern:*

Be it known that I, JOSEPH C. WALIER, of Syracuse, in the county of Onondaga, in the State of New York, have invented new and useful Improvements in a Car Brake and Fender Combined, of which the following, taken in connection with the accompanying drawings, is a full, clear, and exact description.

The object of this invention is to provide more efficient and positively-acting means for preventing accidents by cars running over persons crossing the track in front of the car while in motion; and to that end the invention consists in the novel construction and combination of wheel-brakes and track-brakes united by forwardly-extending brackets formed with longitudinally-concaved tops, the fender-apron attached to said tops, hangers supporting the combined brakes and fender in an elevated position, couplings detachably connecting said hangers to the truck to permit said brakes and fender to be suddenly dropped into operative positions, track-levers and chains operating the wheel-brakes, and means for releasing the hangers from their couplings, all as hereinafter more fully and specifically set forth in the claims.

In the annexed drawings, Figure 1 is a side elevation of a street-car equipped with my invention. Fig. 2 is an enlarged side elevation of a car-truck, showing my invention as used merely for wheel-brakes. Fig. 3 is a plan view of said truck. Figs. 4 and 5 are detail views of two forms of supports for the combined brake and fender, and Fig. 6 is an enlarged transverse section on line $xx$ in Fig. 1.

Similar letters of reference indicate corresponding parts.

A represents the car-body, and B the car-truck, both of which may be of any suitable or well-known form.

$a$ denotes the wheel-brake, the shoes of which are of the usual segmental shape to bear on portions of the peripheries of the wheels C C and are operated by the usual brake-lever $a'$, which is connected by rods or chains $b\,b$ to the cross-bar $c$ attached to the brake-shoes. Chains $d\,d$ connect said lever to the shafts $e\,e$ pivoted to the ends of the car and provided with hand-wheels $e'\,e'$ for turning said shafts in setting the brake in the usual and well-known manner.

The brake-shoes of the wheel-brake have attached to them or formed integral with them forwardly-extending brackets $f\,f$, the bottoms of which are straight and nearly or quite tangential to the segmental faces of the aforesaid brake-shoes and constitute the brake-shoes $h\,h$ of a track-brake. The tops of the brackets are formed concave longitudinally and have fastened to them the fender D, which spans the space between the brackets and extends the length of said brackets. Said fender may consist of either stout wire-netting or other suitable material.

The described combined brake and fender are suspended from either the car-body or the car-truck by vertically-yielding hangers $j$ so as to allow said brakes and fender to be brought simultaneously into position to stop the car and pick up a person who may happen to be in front of the car under motion. Said vertically-yielding hangers I prefer to connect to supporting-brackets $i\,i$ attached either to the under side of the car-body, as represented in Fig. 5 of the drawings, or to the truck, as shown in Fig. 2 of the drawings, which brackets I provide with sliding bolts $l$ or other suitable couplings for engaging and releasing the links or hangers $j\,j$ which are attached to the aforesaid brakes, preferably to the ends of the cross-bar $c$. Said hanger-supports may be constructed of different shapes, two of which I have shown in Figs. 4 and 5 of the drawings.

In Fig. 4 the hanger $j$ consists simply of a metal bar connected to the cross-bar $c$ and provided in its upper end with an eye through which the sliding bolt $l$ passes. In Fig. 5 the bracket $i$ is formed with a vertically-elongated slot $i'$, in which is sustained a slide $n$ supported in its elevated position by the bolt $l$ passing under the bottom thereof. The hanger $j$ is connected to the side of said slide and to the cross-bar $c$. The bolt $l$ is connected by a rod or chain $o$ to the lower end of a lever $g$ fulcrumed on the platform P of the car, as shown in Fig. 1 of the drawings.

The operation of my described invention is as follows: Ordinarily the hangers $j$ are connected to the coupling-bolt $l$ to support the brakes elevated from the track and allow the wheel-brakes $a\,a$ to swing to and from the wheels C C and to be operated substantially in the same manner as ordinary wheel-brakes. In case it becomes necessary to stop the car more quickly than can be effected by the wheel-brakes, the brakeman operates the lever $g$ so as to draw the bolts $l\ l$ out of engagement with the hangers $j\ j$. This allows the brakes to drop so as to carry the track-brake under the front of the wheels and become interposed between said wheels and track and by frictional contact with the latter stop the motion of the car. In placing the track-brake in this position the fender D is presented in front of the wheels and so close to the track as to cause the person struck by the said fender to fall upon the same and thus prevent the wheels from running over the person. The safety against such accidents is greatly enhanced by the quick stopping of the car due to the application of the track-brake, and by the arrangement of devices by which the action of the fender is under perfect control of the person in charge of the car.

To guard against the lifting of the rear end of the car incident to the aforesaid quick stopping of the momentum of the car, especially in descending a steep grade, I pivot to the front end of each track-brake a track-roller $r$ sustained with its tread above and in proximity to the plane of the track-bearing of said brake. In case the rear end of the car is lifted as aforesaid the rollers $r\ r$ are brought to bear on the two track-rails and thus release the track-brake from the track.

What I claim as my invention is—

1. The combination of the truck-frame provided at its ends with brackets —$i$—$i$—, the brackets —$f$—$f$— formed with the wheel-brake-shoes —$a$—, track-brake-shoes —$h$— and longitudinally concaved tops, the fender —D— attached to said tops, the hangers —$j$—
and couplings —$l$— detachably connecting the brackets —$f$—$f$— to the brackets —$i$—$i$— and a hand-lever for disconnecting said brackets all constructed and combined to place the operations of the wheel-brake, track-brake and fender simultaneously under control of the person in charge of said devices as set forth.

2. The combination, with a track-brake, of track-rollers secured to the front end of the brake and sustained with its tread above and in proximity to the plane of the track-bearing of the brake as and for the purpose set forth.

In testimony whereof I have hereunto signed my name this 24th day of April, 1895.

JOSEPH C. WALIER. [L. S.]

Witnesses:
 J. J. LAASS,
 C. L. BENDIXON.